July 16, 1963 J. LEWINSKI ETAL 3,097,430
CUTTER
Filed July 3, 1961 2 Sheets-Sheet 1
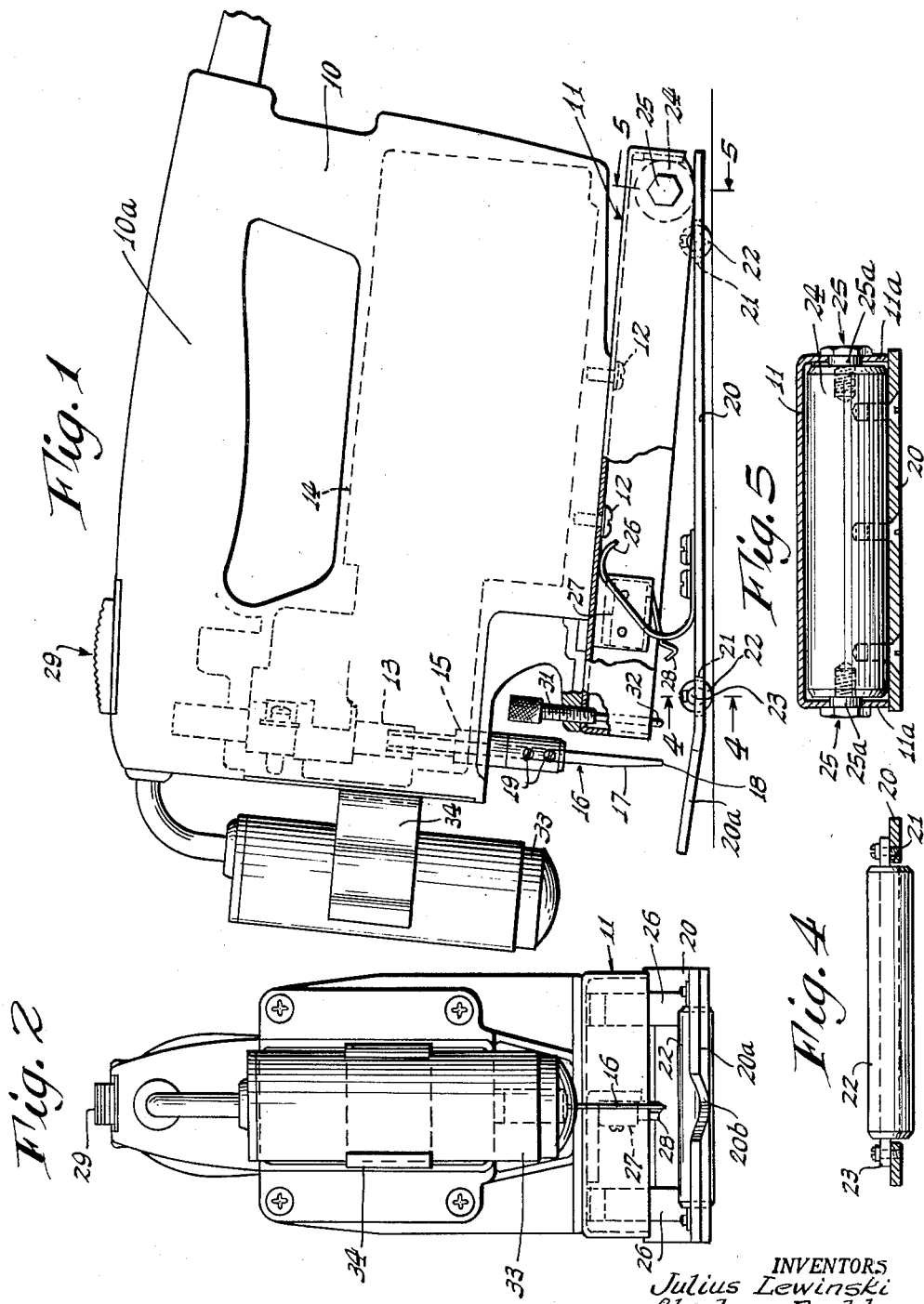
INVENTORS
Julius Lewinski
Abraham Rashbaum
BY
Johnson and Kline
ATTORNEYS July 16, 1963 J. LEWINSKI ETAL 3,097,430
CUTTER
Filed July 3, 1961 2 Sheets-Sheet 2
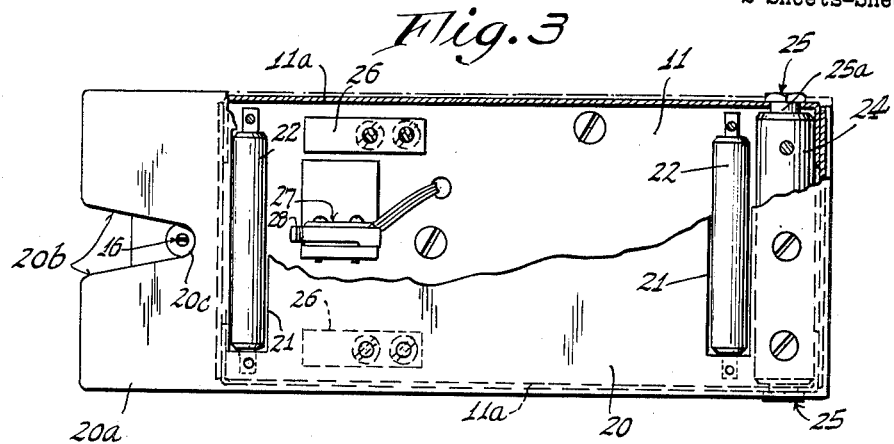
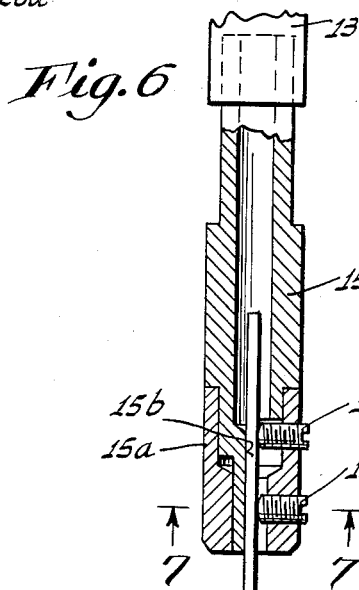
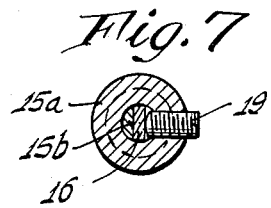
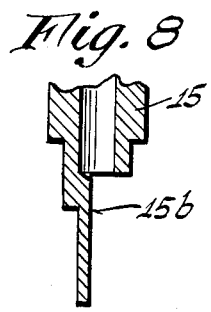
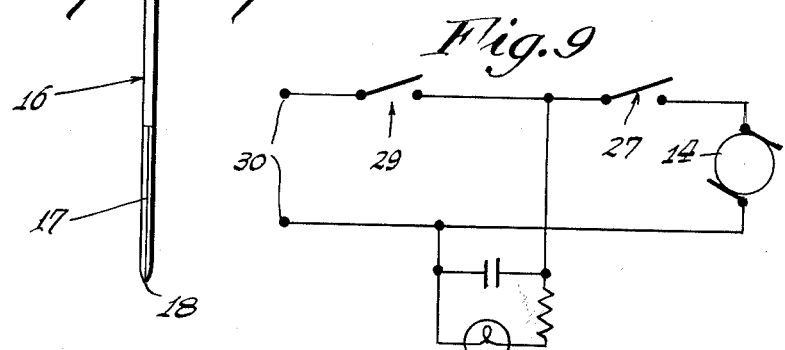
INVENTORS
Julius Lewinski
Abraham Rashbaum
BY
Johnson and Kline
ATTORNEYS

United States Patent Office 3,097,430
Patented July 16, 1963

3,097,430
CUTTER
Julius Lewinski, New York, and Abraham Rashbaum, Whitestone, N.Y., assignors to Willcox & Gibbs Sewing Machine Company, New York, N.Y., a corporation of New York
Filed July 3, 1961, Ser. No. 121,700
5 Claims. (Cl. 30—273)

The present invention relates to a cutting device and is particularly useful in providing a device for cutting superposed pattern sheets in simultaneously grading a plurality of patterns.

It is an object of the invention to provide a device which is easy to handle and maneuver over the patterns to cut one or more of the pattern sheets as desired.

A feature of the invention resides in the novel contact plate construction which holds the cutting device in a normally inoperative position until it is manually moved into operative cutting relation in which the cutting means is energized, thus facilitating the cutting operation.

Another feature of the invention resides in the provision of means for limiting the depth of cut when the cutting device is in operative relation.

A further feature of the invention resides in the provision on the contact plate of rollers which act to eliminate any inadvertent lateral movement of the device as it is moved during a cutting operation.

A still further feature of the invention resides in providing signal means for indicating that the power is applied to the cutting device while it is in normally inoperative position to prevent inadvertent operation thereof, which signal device may also function as an illuminating means for illuminating the area in which the cut is made.

Other features and advantages of the invention will be apparent from the specification and claims when considered in connection with the accompanying drawings in which:

FIGURE 1 is a side view of the cutter device.

FIG. 2 is a front view of the cutter device.

FIG. 3 is a bottom view, partly in section, of the cutter device.

FIG. 4 is a sectional view taken along line 4—4 of FIG. 1.

FIG. 5 is a sectional view taken along line 5—5 of FIG. 1.

FIG. 6 is a view partly in section of the chuck and blade therein of FIG. 1.

FIG. 7 is a sectional view taken along line 7—7 of FIG. 6.

FIG. 8 is a fragmentary view of the end of the chuck.

FIG. 9 is a diagrammatic electrical circuit for the machine.

As shown in the drawings, the device of the present invention comprises a housing 10 having a handle portion 10a and a base 11 secured thereto by screws 12 or the like. The forward part of the housing has mounted therein a reciprocating shaft 13 which is driven by the usual electric motor reciprocating means 14. The end of the shaft 13 has a chuck 15 provided with a cap 15a mounted thereon for mounting a cutting blade 16. The cutting blade is of the type shown in FIGS. 1 and 6 having an inclined forward cutting edge 17 and a substantially flat bottom cutting edge 18. The blade is secured in the chuck by screws 19 clamping it to a flat surface 15b as shown in FIG. 6 so that the tip of the cutting blade is movable to a position below the base for cutting engagement with the material to be cut.

A contact plate 20 extends under the base and has openings 21 therein in which transverse rollers 22 are rotatably mounted on axles 23 secured to the upper surface of the plate in such a manner that the rollers project through the openings in the plate and engage the material being cut. This enables the device to be moved over the material being cut easily and without any tendency for the material to move laterally as an incident thereto.

The rear end of the plate is provided with a pivot member 24 secured to the plate to project above the plate and into the base and is pivotally mounted therein by pivot screws 25 having bearing portions 25a, which screws pass through the flanges 11a of the base and are threaded into the end of the pivot member. As is shown in FIGS. 1 to 3, the forward portion 20a of the contact plate is inclined upwardly and is provided with a notch 20b terminating in a hole 20c through which the cutter may project into cutting contact with the material. The notch is V-shaped and wide enough to permit the operator to have clear view of the line of cutting in guiding the device during a cutting operation.

In accordance with the present invention, the housing 10 is held in a normally inoperative raised position with respect to the contact plate, as shown in FIG. 1, and the device is rendered operative when the housing is moved toward the plate 20 a predetermined distance to move the cutting blade into cutting relation with the material. The housing is held in its normal inoperative position by a pair of springs 26 secured to the contact plate to project upwardly into the base member, as shown in FIGS. 1 and 2, to yieldably hold the housing in its normally raised inoperative position. A control microswitch 27 is mounted within the base and has an actuator 28 for controlling the operation of the motor driven reciprocating mechanism 14 for the cutter blade when the housing is moved toward the plate a predetermined distance for causing the actuator to engage the plate.

As shown in FIGS. 1 and 9, the device is provided with a manually operated slide switch 29 which is an on-off switch and connects and disconnects a circuit in the device to a source of energy indicated at 30. The motor driven reciprocating means 14 is connected to said circuit through the control microswitch 27 so that when the cutting device is connected to the source of energy but is held in its normally inoperative position away from the contact plate by the springs 26, the normally open circuit at the microswitch 27 prevents operation of the reciprocating cutter.

When it is desired to use the device, it is lifted by the handle 10a and placed on the material in position to make a required cut. Thereafter, the housing and base are moved toward the plate and against the springs 26 a distance to carry the cutter into engagement with the material to be cut. At this time the actuator 28 for the normally open microswitch closes the circuit and energizes the reciprocating means 14 for the cutter.

If desired, the depth of the cut made by the cutter can be controlled. This is accomplished by providing the housing with a screw 31 threaded therein and having a projecting contact point 32 which is adapted to engage the contact plate and limit the movement of the housing toward the plate and consequently the distance of the reciprocation of the cutter toward the material.

Preferably, a signal may be provided for indicating when the device is connected to a source of energy so that it will not be inadvertently operated. As shown in FIG. 9, the signal is illustrated as a light 33 which is connected in the circuit when the device is connected by the switch 29 to indicate that the device is connected to the source of energy. If desired, the signal light can be made in the form of an illuminating device mounted on the front of the housing by a clip 34 in position to project its rays downwardly on the work to illuminate the work in advance of the tool to facilitate the cutting operation.

Variations and modifications may be made within the scope of the claims and portions of the improvements may be used without others.

We claim:

1. A power operated cutting device comprising a housing; a base secured to the housing; a reciprocating shaft and a cutter carried thereby mounted on the housing adjacent the forward end thereof for reciprocation in the direction of the base to a cutting position below said base; a contact plate adapted to be supported on the surface of a material to be cut and pivotally mounted on the base adjacent the rear end thereof; means normally urging the base away from the contact plate and to a raised position; means reciprocating said shaft when the base is moved toward said plate a predetermined distance and said cutter engages the material to cut the same; and means limiting the movement of the base toward said plate whereby the penetration of the cutter into the material is controlled.

2. A power operated cutting device comprising a housing; a base secured to the housing; a reciprocating shaft and a cutter carried thereby mounted on the housing adjacent the forward end thereof for reciprocation in the direction of the base to a cutting position below said base; a contact plate having transverse rollers adapted to be supported on the surface of a material to be cut and prevent undesired lateral movement of the device, said plate extending under the base and being pivotally mounted on the base adjacent the rear end thereof, the forward end of the contact plate being upwardly inclined and having a notch terminating in a cutter-receiving opening to facilitate guiding of the device over the material; spring means normally urging the base away from the contact plate and to a raised position; and means reciprocating said shaft, including a control switch means, operable when the base is moved against said spring means toward said plate a predetermined distance and said cutter engages the material to cut the same.

3. A power operated cutting device comprising a housing; a base secured to the housing; a reciprocating shaft and a cutter carried thereby mounted on the housing adjacent the forward end thereof; electrically operated means for reciprocating the cutter in the direction of the base to a cutting position below said base; a contact plate having transverse apertures therein, axles secured to the plate, rollers rotatable on the axles and projecting through the apertures so as to be supported on the surface of a material to be cut and prevent undesired lateral movement of the device, said plate being pivotally mounted on the base adjacent the rear end thereof, the forward end of the contact plate being upwardly inclined and having a notch terminating in a cutter-receiving opening to facilitate guiding of the device over the material; spring means normally urging the base away from the contact plate and to a raised position; and switch means controlling the electrically operated means reciprocating said cutter when the base is moved against said spring means toward said plate a predetermined distance and said cutter engages the material to cut the same.

4. A power operated cutting device comprising a housing; a base secured to the housing; a reciprocating shaft and a cutter carried thereby mounted on the housing adjacent the forward end thereof; electric motor means for reciprocating said shaft in the direction of the base to a cutting position below said base; a contact plate adapted to be supported on the surface of a material to be cut and pivotally mounted on the base adjacent the rear end thereof; means normally urging the base away from the contact plate and to a raised position; and switch means comprising an on-off switch for connecting the device to a source of current, and a control switch for completing a circuit to said motor means and actuated when the base is moved toward said plate a predetermined distance to energize said motor and cause said cutter to cut the material.

5. A power operated cutting device comprising a housing; a base secured to the housing; a reciprocating shaft and a cutter carried thereby mounted on the housing adjacent the forward end thereof; electric motor means for reciprocating said shaft in the direction of the base to a cutting position below said base; a contact plate adapted to be supported on the surface of a material to be cut and pivotally mounted on the base adjacent the rear end thereof; means normally urging the base away from the contact plate and to a raised position; and switch means comprising an on-off switch for connecting the device to a source of current and to an indicator light on the housing, and a control switch for completing a circuit to said motor means and actuated when the base is moved toward said plate a predetermined distance to energize said motor and cause said cutter to cut the material.

References Cited in the file of this patent

UNITED STATES PATENTS

| | | |
|---|---|---|
| 590,140 | Eastman | Sept. 14, 1897 |
| 1,271,279 | Clark | July 2, 1918 |
| 1,974,642 | Colby | Sept. 25, 1934 |
| 2,552,471 | Watkins | May 8, 1951 |
| 2,592,649 | Brackett | Apr. 5, 1952 |
| 2,787,679 | Moretz | Apr. 2, 1957 |
| 2,966,742 | Harian | Jan. 3, 1961 |